(12) United States Patent
Herbst et al.

(10) Patent No.: US 11,021,086 B2
(45) Date of Patent: Jun. 1, 2021

(54) VEHICLE SEAT WITH ABRASION PROTECTION

(71) Applicant: GRAMMER AG, Amberg (DE)

(72) Inventors: Gerald Herbst, Sulzbach-Rosenberg (DE); Martin Wellein, Regensburg (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 16/659,812

(22) Filed: Oct. 22, 2019

(65) Prior Publication Data

US 2020/0122615 A1 Apr. 23, 2020

(30) Foreign Application Priority Data

Oct. 23, 2018 (DE) .......................... 102018126360.0

(51) Int. Cl.
*A47C 7/02* (2006.01)
*B60N 2/58* (2006.01)

(52) U.S. Cl.
CPC ................... *B60N 2/5875* (2013.01)

(58) Field of Classification Search
CPC ....... B60N 2/58; B60N 2/5891; B60N 2/5875
USPC ...... 297/218.1, 218.2, 452.61, 463.2, 452.62
See application file for complete search history.

(56) References Cited

U.S. PATENT DOCUMENTS

| 4,810,559 | A | | 3/1989 | Fortier et al. | |
|---|---|---|---|---|---|
| 5,809,582 | A | * | 9/1998 | Lane | A47K 17/02 297/284.5 |
| 6,769,146 | B2 | * | 8/2004 | Copeland | B60N 2/58 297/452.61 |
| 7,258,399 | B2 | * | 8/2007 | Neustat | A47C 7/72 297/219.1 |
| 2002/0106953 | A1 | | 8/2002 | Kim et al. | |
| 2004/0160111 | A1 | * | 8/2004 | Koffler | A47C 7/029 297/452.25 |
| 2008/0061610 | A1 | * | 3/2008 | Tache | A47C 31/00 297/219.1 |
| 2008/0206526 | A1 | | 8/2008 | Kim et al. | |

(Continued)

FOREIGN PATENT DOCUMENTS

| AT | 009697 | 2/2008 |
|---|---|---|
| AT | 518103 | 7/2017 |

(Continued)

OTHER PUBLICATIONS

Official Action for German Patent Application No. 102018126360.0, dated Sep. 6, 2019, 3 pages.

(Continued)

*Primary Examiner* — Chi Q Nguyen
(74) *Attorney, Agent, or Firm* — Sheridan Ross P.C.

(57) ABSTRACT

A vehicle seat for a vehicle having a backrest part and a seat part are provided. The backrest part and the seat part each have an inner portion and side bolster portions arranged laterally on both sides of the inner portion The inner portions and the side bolster portions each have a cushion part and an upholstery part at least partially surrounding the cushion part. An abrasion-resistant coating that has a higher hardness and/or stiffness than the at least one upholstery part is at least in part arranged on at least one of the upholstery parts.

15 Claims, 5 Drawing Sheets

(56) References Cited

U.S. PATENT DOCUMENTS

| | | | |
|---|---|---|---|
| 2011/0049949 A1* | 3/2011 | Basmaji | B60N 2/6036 |
| | | | 297/219.1 |
| 2013/0209735 A1 | 8/2013 | Kim et al. | |
| 2013/0225019 A1 | 8/2013 | Pozzi | |
| 2016/0107552 A1* | 4/2016 | Wakeman | A47C 31/10 |
| | | | 297/229 |
| 2016/0167594 A1* | 6/2016 | Yaghoubi | B64D 11/064 |
| | | | 297/163 |
| 2018/0215296 A1* | 8/2018 | Hosbach | B60N 2/58 |

FOREIGN PATENT DOCUMENTS

| | | |
|---|---|---|
| DE | 29812075 | 9/1998 |
| DE | 19917176 | 10/2000 |
| DE | 102004040400 | 4/2005 |
| DE | 102005013613 | 9/2006 |
| DE | 102014110611 | 1/2016 |
| DE | 202016106014 | 11/2016 |
| DE | 102017103085 | 8/2017 |
| DE | 102016116735 | 3/2018 |
| EP | 1882610 | 1/2008 |
| FR | 2942423 | 8/2010 |
| JP | 2005-246048 | 9/2005 |
| JP | 2005-329090 | 12/2005 |

OTHER PUBLICATIONS

Extended Search Report for European Patent Application No. 19203537.6, dated May 7, 2020, 3 pages.

* cited by examiner

VEHICLE SEAT WITH ABRASION PROTECTION

CROSS-REFERENCE TO RELATED APPLICATIONS

This application claims the benefit of German Patent Application No. DE 10 2018 126 360.0 filed Oct. 23, 2018, the entire contents of which are incorporated herein by reference.

FIELD

The invention relates to a vehicle seat for a vehicle, in particular for a utility vehicle, having a backrest and a seat part, each having an inner portion and side bolster portions arranged laterally on both sides of the inner portion, the inner portions and the side bolster portions each having a cushion part and an upholstery part that surrounds said cushion part at least in part.

BACKGROUND

Particularly in the case of forklift or construction equipment seats, material wear during use is considerable. The upholstered side walls or side bolster portions in the driver's entry or exit regions are particularly affected. Over the long term, the friction and shear stress, especially on the upholstered side walls, leads to abrasion, thread breakage or the formation of cracks or holes in the surface material depending on the exposure period, driver, application, and climatic conditions. Once this has occurred, the damage continues through the foam part or cushion part to such an extent that the side bolsters break entirely.

Cushion parts of such seats are, for example, conventionally foamed and then covered with a suitable upholstery part. An alternative method provides for the upholstery part to first be deep-drawn into the desired shape and then foam-backed. Knitted fabric or PVC having integrated knitted fabric is generally used as an upholstery part. Because a good stretching behaviour of the surface material is important, particularly in the case of the alternative method, it is not advisable to wish to achieve a higher wear resistance of the entire seat by using a material having a higher degree of stiffness for the upholstery part. Furthermore, the material of the upholstery part is more or less stretched and thus in part weakened during the deep-drawing process. In the region of the side bolsters in particular, the material generally experiences the greatest drawing depth and is prestressed where the highest mechanical stress also occurs later on.

SUMMARY

The object of the present invention is therefore to develop a vehicle seat or seat that has increased abrasion protection at the locations subjected to stress.

The object of the present invention is achieved by a vehicle seat for a vehicle having a backrest part and a seat part, each having an inner portion and side bolster portions arranged laterally on both sides of the inner portion, the inner portions and the side bolster portions each having a cushion part and an upholstery part at least partially surrounding the cushion part, an abrasion-resistant coating that has a higher hardness and/or stiffness than the at least one upholstery part being at least in part arranged on at least one of the upholstery parts.

Thus, an additional coating on the upholstery parts and the selection of the properties of the coating ensure that the abrasion of the upholstery part and thus the damage to the cushion part and the entire seat is minimised. This avoids seats being prematurely subject to wear and having to be replaced. The coating thus, at least in part, creates a functional region on the seat that can also be referred to as a protector or cushion protector.

Preferably, the layer of the seat facing the driver, i.e., the top layer extending from the cushion part as the innermost layer, is configured either by means of the upholstery part or by means of the abrasion-resistant coating. Therefore, the seat is preferably free of further layers and/or other elements arranged on the upholstery part or the upholstery parts. The properties of the coating, such as hardness or tensile strength, are preferably the same over a total thickness, length, and/or width of the coating.

The upholstery part, which can also be referred to as a substrate, and the coating must generally comply with current automotive standards with respect to their mechanical, physical, and chemical properties.

The properties of the upholstery part are also decisively responsible for the processing process. The coating must be designed in such a way that the adhesion between the coating and the upholstery part is ensured when the upholstery part is subjected to mechanical stress (for example in the form of stretching or shearing).

The coating can be applied, for example, to the completely foamed and completely moulded seat. However, it is particularly advantageous if the coating is already applied to the upholstery part before the upholstery part is formed. The upholstery part is preferably shaped by means of deep drawing. The deep-drawn upholstery part provided with the coating can then be placed into a mould and foam-backed with a further material that forms the cushion part after curing.

If a blank of the upholstery parts of the seat part is provided with the coating only in part, said blank is advantageously provided with a plurality of markings (e.g., dashes, notches), which are necessary for aligning the blank in the foaming mould so that the partially coated surface can be moved to the desired position (e.g., in the side bolster portion) during the deep-drawing process. The stretching of the upholstery part as a function of the cushion design must be taken into account in the design of the surface to be coated, that is, the surface to be provided with the coating and the position thereof on the deep-drawn, that is, stretched upholstery part in the corresponding foaming mould are recorded in advance and, ultimately, unrolled onto the non-stretched blank of the upholstery part. The data of the surface in the unstretched state and the position thereof are the basis for the partial coating of the material blank.

It is advantageous for the coating to be arranged on a first surface of the upholstery part and for the cushion part to be arranged on a second surface of the upholstery part, the first surface being arranged such that it faces away from the second surface.

Here, the upholstery parts and/or the cushion parts of the seat part and of the backrest part can each be manufactured individually or simultaneously.

Preferably, all upholstery parts and/or all cushion parts of the seat part are designed integrally with each other. Preferably, all upholstery parts and/or all cushion parts of the backrest part are designed integrally with each other. In other words, the seat part and/or the backrest part are preferably manufactured as one part.

Preferably, in each inner portion and each side bolster portion that is provided with a coating, the upholstery part, the cushion part, and the coating are mechanically connected to one another in a fixed manner. This preferably applies to the inner portion and the side bolster portions of the seat part and/or the backrest part.

This makes it substantially easier to install such a seat, but also to replace of individual components.

A suitable material of the upholstery part is, for example, a synthetic leather made of PVC (polyvinyl chloride, also called "vinyl") or polyurethane (PU). Furthermore, it is possible to use a woven or knitted fabric as the material of the upholstery part.

The coating can be applied to the upholstery part, for example, by means of a printing process such as stencil printing.

Alternatively, the coating that is not yet cured can be present as a paste that is applied to the upholstery part and then distributed uniformly by means of a doctor blade, which is generally referred to as doctoring.

It has proved to be particularly advantageous if the abrasion-resistant coating comprises particles that are based on glass, ceramic or metal and are preferably bound in a binder matrix consisting of a polymer adhesive. The term particles is taken to mean a material that differs from the surrounding, continuous medium (polymer adhesive) by a phase interface. For example, the polymer adhesive is based on polyurethane (PU).

It can be advantageous if the entire seat and thus all upholstery parts of the seat are provided with a coating. However, because it is known in practice that the side bolster portions in particular are subjected to the most stress, it can be advantageous for cost reasons if the abrasion-resistant coating is arranged solely on only one or at least two of the upholstery parts of the side bolster portions.

The inner portions are preferably free of the coating.

The side bolster portions of the seat part are, in turn, subjected to a higher degree of stress than the side bolster portions of the backrest part because the driver inevitably touches the side bolster portions of the seat part, but not necessarily the side bolster portions of the backrest part, upon each entry and exit. According to a further preferred variant, it is therefore preferred if only one or both side bolster portions of the seat part are provided with a coating, and, at the same time, both inner portions and the side bolster portions of the backrest part are free of the coating.

In each said embodiment, the coating can be designed as a full-surface coating or can extend only over a sub-region of the respective upholstery part. This sub-region can be contiguous. Alternatively, the sub-region can be divided into a plurality of individual, non-contiguous regions. The latter embodiment is advantageous because a continuous coating whose stiffness could possibly adversely affect the deep-drawing behaviour of the upholstery part is avoided.

According to a preferred embodiment, it is therefore advantageous if the at least one upholstery part has first surface portions that are provided with the abrasion-resistant coating over their entire surface and second surface portions that are free of the abrasion-resistant coating. For example, the first and/or second surface portions are distributed homogeneously over the entire surface of the at least one upholstery part.

For the purposes of the present invention, a ratio of a total content of the first surface portions to a total content of the second surface portions is understood to be an application density of the coating. In this case, the ratio is considered for a part of the entire surface of the upholstery part, this part of the entire surface being predetermined and identical in each case for the consideration.

For example, the application density is constant over the entire surface of the at least one upholstery part. This application density should not be confused with the material density of the coating alone, which is known to represent the ratio of the mass and the volume of the coating.

However, it has been shown in practice that the stress on the upholstery parts of the seat part is highest on an outer side of the seat, for example in the exit region in the case of forklift seats. These regions in particular are subjected to extreme friction and shearing due to frequent entering and exiting, which initially causes the upholstery part surface to be worn through, then continues through the destruction of the underlying cushion part, and, ultimately, causes the entire side bolster to be torn off.

By means of a gradient with respect to the application density, the coating can advantageously be applied above all where it is most needed. It is therefore advantageous if a value of a ratio of a total content of the first surface portions to a total content of the second surface portions changes in a course of a longitudinal direction, a width direction, and/or a height direction of the vehicle seat.

The value of the above ratio preferably corresponds to the application density. Particularly preferably, this value decreases in the width direction of the seat starting from an outer side of the seat towards a virtual plane that divides the seat centrally in the width direction. For example, this decrease is constant.

Because tolerances of the material properties and the process parameters (for example with respect to the temperature or the setting of a clamping frame, with different workers, etc.) can occur during the deep-drawing process, it is possible that precise positioning of the partially coated surfaces cannot always be guaranteed. In addition, a graded application thickness has the positive effect of allowing, as it were, a diffuse transition between regions having a high application thickness and regions having a low application thickness to be set with respect to the coating. This makes it possible to retouch positioning errors of the coating, which would become noticeable above all in the case of sharp geometric transitions of the seat part, from the observer's viewpoint. Such a sharp geometric transition exists, for example, in the case of a channel arranged between the inner portions and the side bolster portions.

For the setting of a diffuse transition, it is particularly advantageous if the value of the above-mentioned ratio is provided not with a constant change, but with a varying change in at least one of the above-mentioned directions of the vehicle seat.

The coating itself is preferably made constant in terms of its thickness. It is therefore advantageous if the coating has a homogeneous layer thickness whose value is preferably within a range of 80 µm to 200 µm. This prevents individual coating parts from protruding from the upholstery part beyond the other coating parts and from being torn off easily.

If the coating is applied to the upholstery parts as a kind of pattern, a design feature can be created in addition to the function. For example, the first surface portions are each designed in the shape of a circle and/or a regular polygon.

Furthermore, it is possible for the first surface portions to be provided in different colours and/or shapes. For example, the first surface portions are provided in the shape of a square, a rhombus, a rectangle, and/or a triangle.

It is likewise preferred if the first surface portions are each designed in the shape of a regular hexagon and identical to each other. Furthermore, it is preferred if the second surface portions are each designed in the shape of a regular hexagon and identical to each other.

Regardless of the shape of the first and second surface portions, it is preferable for each of the first surface portions to be arranged directly adjacent to at least one of the second surface portions.

In addition to the above-mentioned coating, of course, further coatings can be applied to the upholstery part. It is conceivable for further functions of the seat part to be adjustable by means of a corresponding coating. Thus, it is conceivable to also minimise soiling, facilitate cleaning, influence conductivity, improve flame retardancy, improve cut resistance, improve the haptics or change the slip or sliding properties in the seat part in addition to improving the abrasion property thereof.

BRIEF DESCRIPTION OF THE DRAWINGS

Further advantages, aims, and properties of the present invention are illustrated by way of the accompanying drawings and the following description, which show and describe a vehicle seat according to the invention or parts thereof by way of example. In the drawings.

DETAILED DESCRIPTION

In all figures, a co-ordinate system that comprises a longitudinal direction 1x, a width direction 1y, and a height direction 1z of the vehicle seat 1 is shown in each case to illustrate the relative positions.

Figure 1:
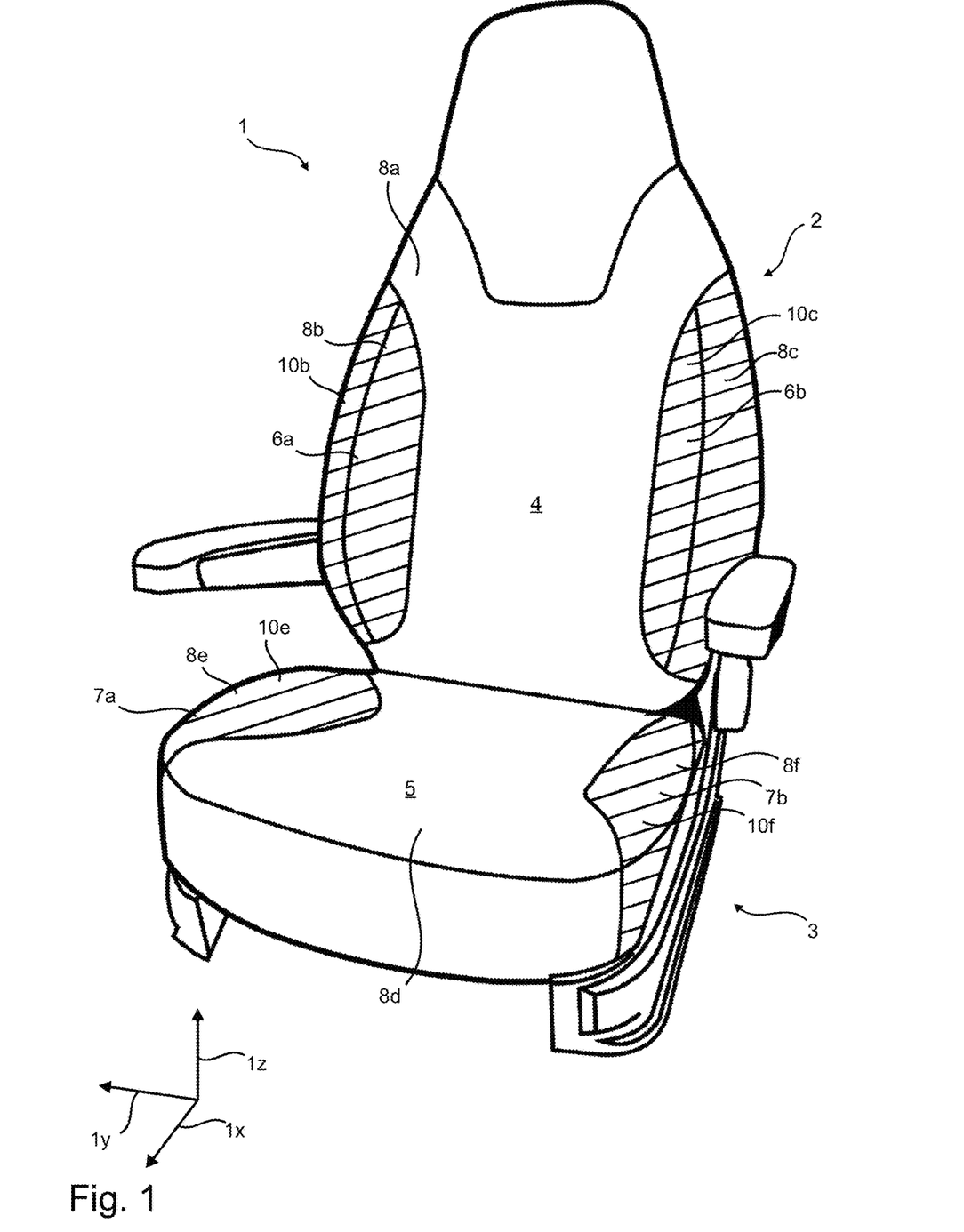
FIG. 1 is a perspective view of a vehicle seat according to the invention.

With reference to FIG. 1, a vehicle seat 1 for a vehicle having a backrest part 2 and a seat part 3 is shown, the backrest part 2 and the seat part 3 each having an inner portion 4, 5 and side bolster portions 6a, 6b, 7a, 7b arranged laterally on both sides of the inner portion 4, 5. The inner portions 4, 5 and the side bolster portions 6a, 6b, 7a, 7b each have a cushion part 9f (not shown in FIG. 1, see FIG. 4a) and an upholstery part 8a, 8b, 8c, 8d, 8e, 8f that surrounds said cushion part at least in part.

It is shown that an abrasion-resistant coating 10b, 10c, 10e, 10f is arranged over the entire surface of four 8b, 8c, 8e, 8f of the upholstery parts 8a-8f (shown hatched), which abrasion-resistant coating has a higher degree of hardness and/or stiffness than the at least one upholstery part 8b, 8c, 8e, 8f. In the present case, the four upholstery parts 8b, 8c, 8e, 8f are assigned to the side bolster portions 6a, 6b, 7a, 7b of the backrest part 2 and the seat part 3.

In the present case, the layer of the vehicle seat 1 facing the driver, i.e., the top layer extending from the cushion part as the innermost layer, is configured either by means of the upholstery part 8a, 8b or by means of the abrasion-resistant coating 10b, 10c, 10e, 10f. In addition, therefore, the seat is free of further layers and/or other elements arranged on the upholstery parts 8a-8f. In the present case, the properties of the coating 10b, 10c, 10e, 10f, such as hardness or tensile strength, are the same over a total thickness t (see FIG. 4a), length, and width of the coating 10b, 10c, 10e, 10f.

The vehicle seat 1 shown was produced by already applying the coating 10b, 10c, 10e, 10f to the respective upholstery part 8b, 8c, 8e, 8f before the upholstery part 8b, 8c, 8e, 8f was formed by means of deep drawing. The upholstery parts 8a, 8b, 8c of the backrest part 2 were then placed into a mould with each other, and, independently thereof, the upholstery parts 8d, 8e, 8f of the seat part 3 were placed into a mould with each other, and in both cases they were foam-backed with another material that forms the cushion part (only 9f shown in FIG. 4a) after curing. Thus, all upholstery parts 8d, 8e, 8f and all cushion parts (only 9f shown) of the seat part 3 are designed integrally with each other. Likewise, all upholstery parts 8a, 8b, 8c and all cushion parts (not shown) of the backrest part 2 are designed integrally with each other.

Figure 2A:
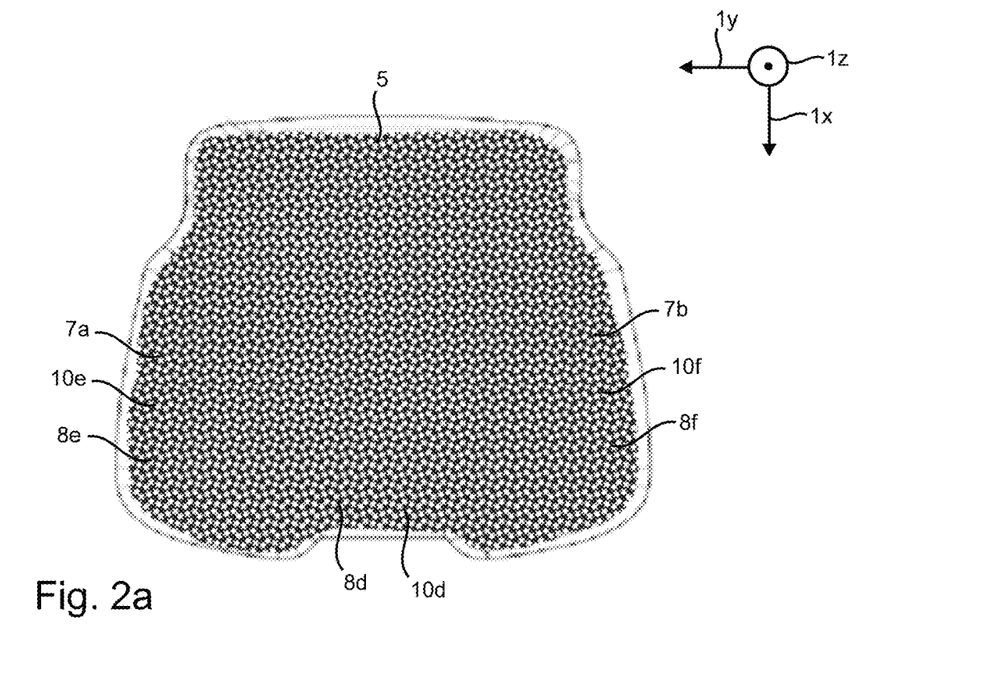
FIGS. 2a-c are plan views of differently designed seat parts of the vehicle seat of FIG. 1.
Figure 2B:
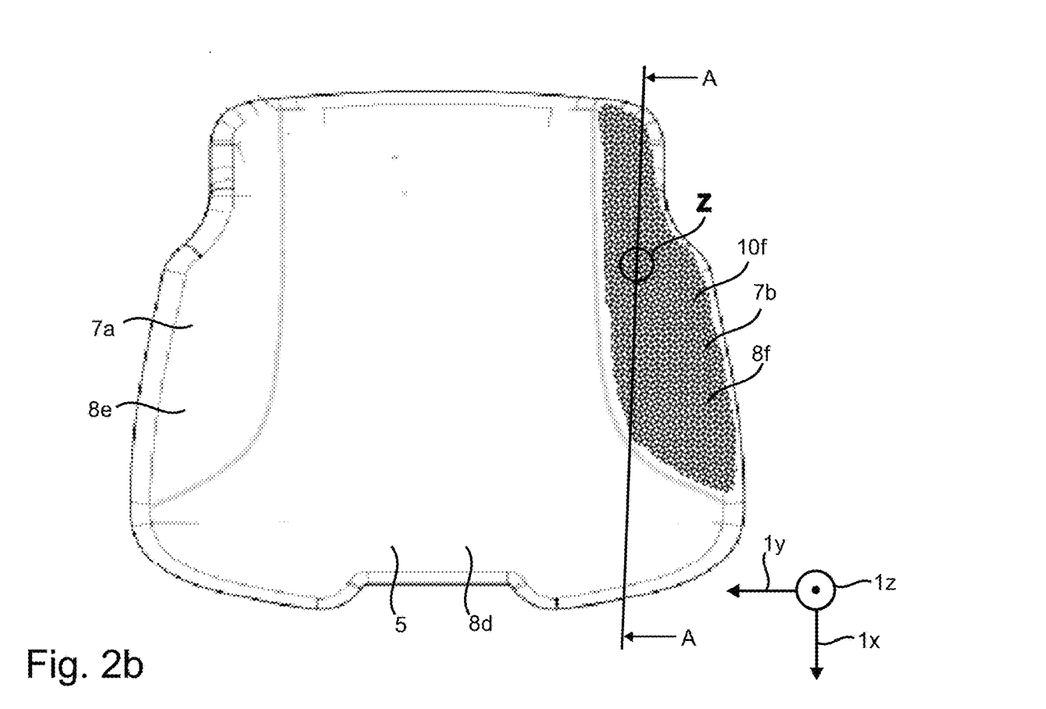
Figure 4A:
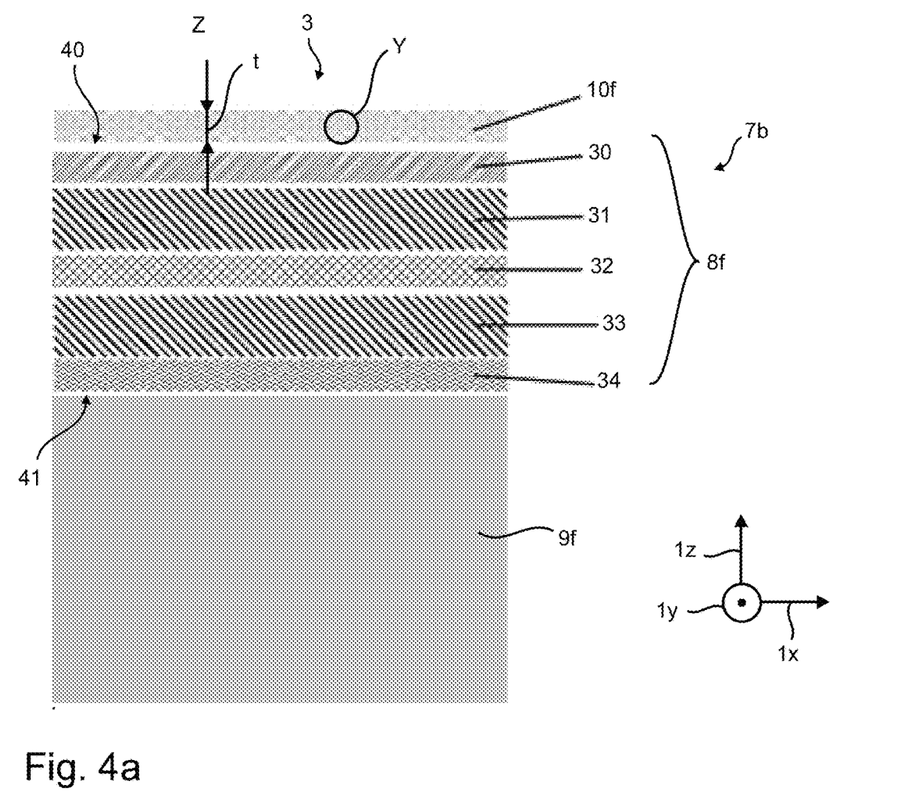
FIGS. 4a, b show details of the materials used.

With reference to the example of the left side bolster portion 7b of the seat part 3, FIG. 4a shows a section Z of a cross-sectional view along the line A-A from FIG. 2b and illustrates that the coating 10f is arranged on a first surface 40 of the upholstery part 8f and the cushion part 9f is arranged on a second surface 41 of the upholstery part 8f, the first surface 40 being arranged such that it faces away from the second surface 41.

In the present case, in each side bolster portion 6a, 6b, 7a, 7b that is provided with a coating, the upholstery part 8b, 8c, 8e, 8f, the cushion part (only 9f shown), and the coating 10b, 10c, 10e, 10f are mechanically connected to one another in a fixed manner.

In the present case, all upholstery parts 8a-8f shown comprise a synthetic leather made of PVC (polyvinyl chloride). The coating 10b, 10c, 10e, 10f was applied to the upholstery part 8b, 8c, 8e, 8f by means of stencil printing.

Figure 4B:
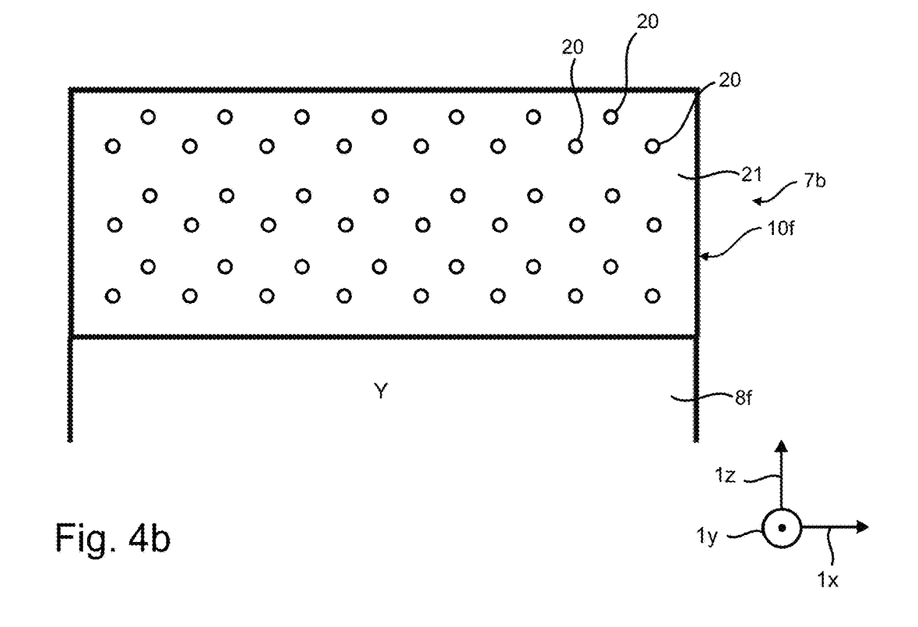

FIG. 4b shows an enlargement of the section Y of FIG. 4a and, with reference to the example of the left side bolster portion 7b of the seat part 3, illustrates that the abrasion-resistant coating 10f has particles 20 that are based on ceramic and bound in a binder matrix 21 comprising a polymer adhesive.

Figure 2C:
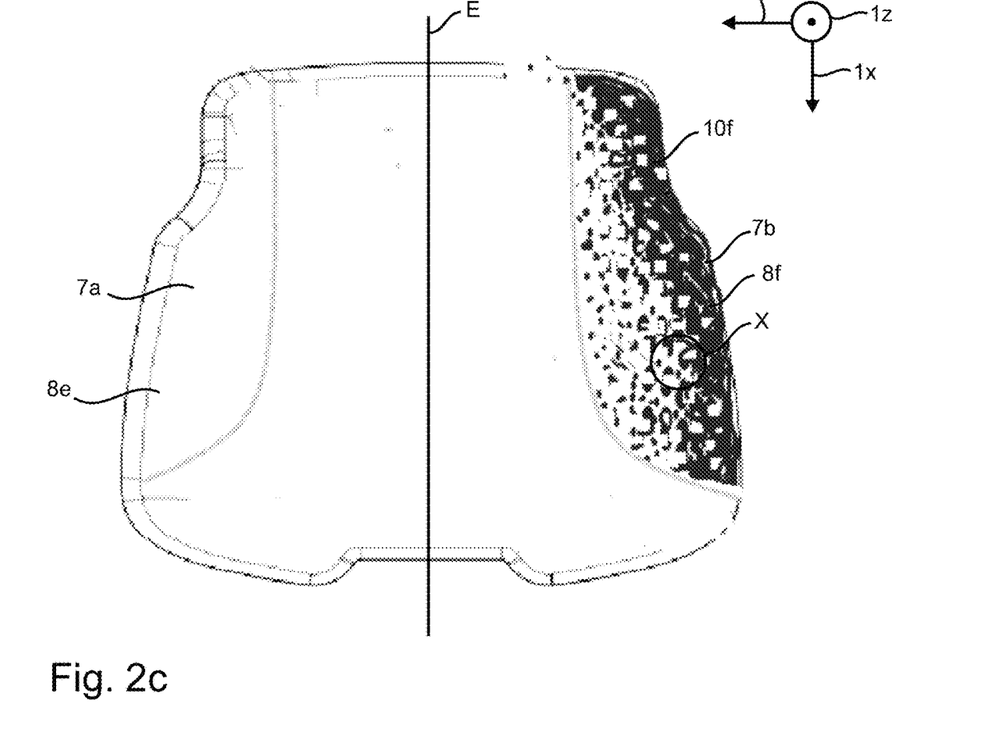

According to the embodiments with reference to FIGS. 1, 2b, and 2c, it is shown that the abrasion-resistant coating 10b, 10c, 10e, 10f is arranged solely on all 8c, 8d, 8e, 8f or only one 8f of the upholstery parts 8c, 8d, 8e, 8f of the side bolster portions 6a, 6b, 7a, 7b. In the present case, the inner portions 4, 5 are each free of the coating in the embodiments of FIGS. 1, 2b, and 2c.

According to FIG. 1, therefore, only all upholstery parts 8b, 8c, 8e, 8f of the side bolster portions 6a, 6b, 7a, 7b are provided with a coating 10b, 10c, 10e, 10f, and the inner portions 4, 5 are, in each case, free of the coating.

FIG. 2a shows only the seat part 3 in which all upholstery parts 8e, 8f of the side bolster portions 7a, 7b and the upholstery part 8d of the inner portion 5 are each provided with a full-surface coating 10e, 10f, 10d.

FIG. 2b shows only the seat part 3 in which only the upholstery part 8f of the left side bolster portion 7b is provided with a full-surface coating 10f.

FIG. 2c shows only the seat part 3 in which only the upholstery part 8f of the left side bolster portion 7b is provided with a coating 10f that has a gradient in the width direction 1y with respect to its application density.

Figure 3A:
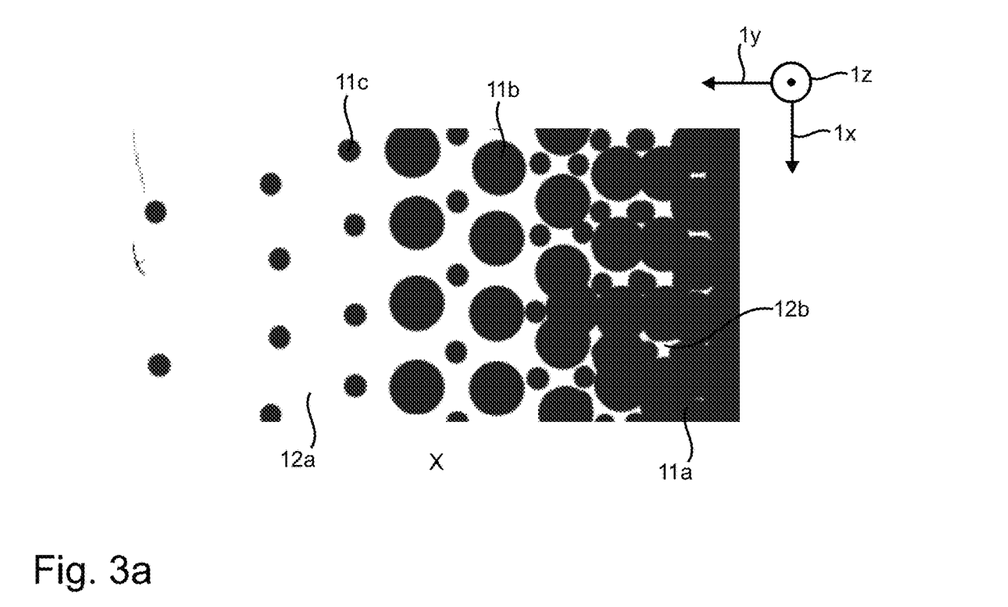
FIGS. 3a-c are schematic views of sections of differently designed coatings.
Figure 3B:
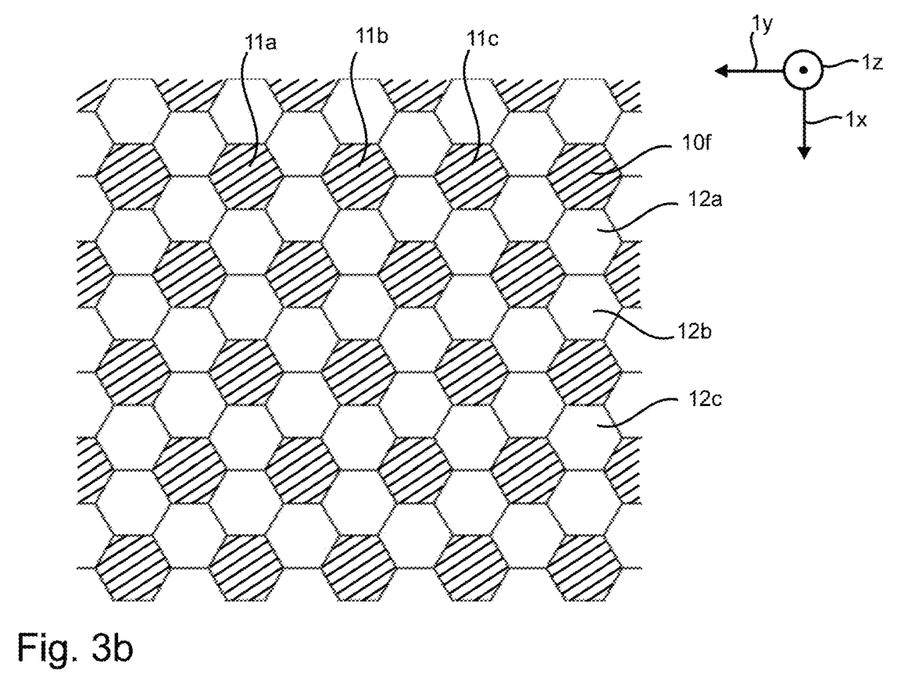
Figure 3C:
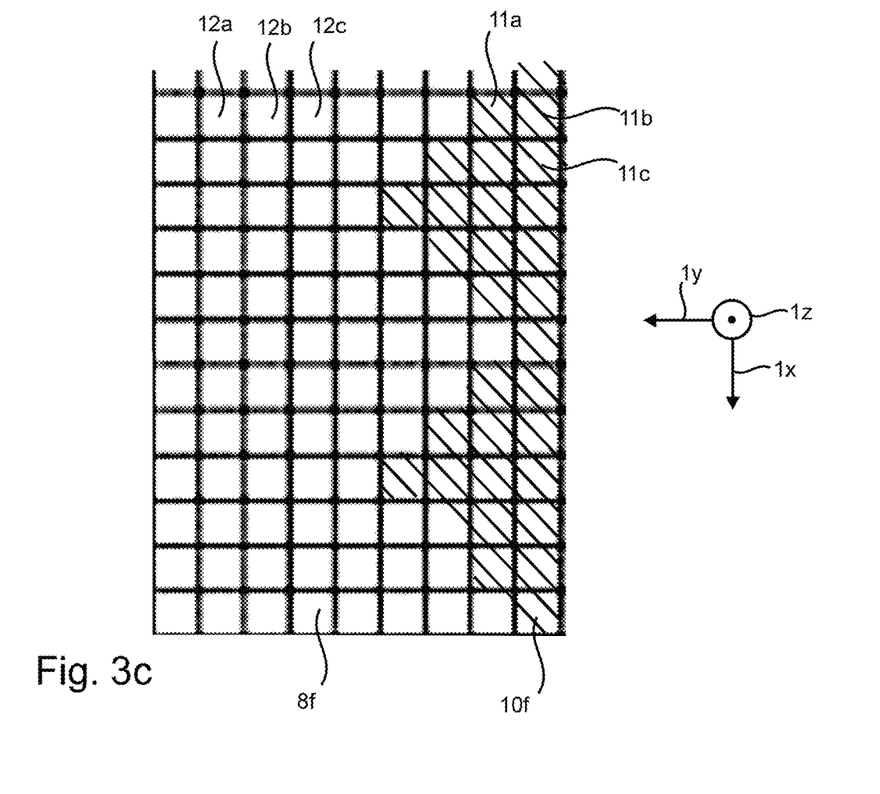

FIG. 3a shows a section X of FIG. 2c. FIGS. 3b and 3c are each alternative embodiments. However, they are intended to represent the same section X in terms of position. With reference to the left side bolster portion 7b, FIGS. 3a, 3b, and 3c show examples of the shape in which the coating 10f can be designed. In each said embodiment, the coating 10f only extends over a sub-region of the upholstery part 8f. This sub-region is divided into several individual regions according to FIGS. 3a and 3b, whereas according to FIG. 3c, it represents a contiguous region.

Thus, according to the embodiments of FIGS. 3a, 3b, 3c, the at least one upholstery part 8f has first surface portions 11a, 11b, 11c (marked by way of example) that are provided with the abrasion-resistant coating 10f over their entire surface and second surface portions 12a, 12b, 12c (also marked by way of example) that are free of the abrasion-resistant coating 10f.

According to the embodiment of FIG. 3b, the first surface portions 11a, 11b, 11c and the second surface portions 12a, 12b, 12c are homogeneously distributed over the entire surface of the upholstery part 8f. The application density is constant over the entire surface of the upholstery part 8f.

According to the embodiment of FIGS. 3a and 3c, a value of a ratio of a total content of the first surface portions 11a, 11b, 11c to a total content of the second surface portions 12a, 12b, 12c changes in a width direction 1y of the vehicle seat 1. In the present case, this value decreases in the width direction 1y of the vehicle seat 1 starting from an outer side of the vehicle seat 1 towards a virtual plane E (see FIG. 2c) that divides the vehicle seat 1 centrally in the width direction 1y. According to the embodiment of FIG. 3c, this decrease is constant. According to the embodiment of FIG. 3a, this decrease in the width direction 1y varies.

FIG. 4a also shows that the coating 10f has a homogeneous layer thickness t whose value in the present case is about 150 μm. In addition, it is shown that the upholstery part 8f comprises a plurality of layers 30-34 in the present case, which layers are arranged between the coating 10f and the cushion part 9f in the sequence 30, 31, 32, 33, 34, of which a layer facing the cushion part 9f is a primer 34, layers 31, 33 are vinyl layers, layer 32 is the textile support, and layer 30 is the finish layer. As already mentioned above, another carrier material (in particular a material based on PU or textile) can also be used in layers 31, 33 instead of vinyl.

All layers 10f, 30, 31, 32, 33, 34, and 9f shown are, in each case, mechanically connected to the adjacent layer(s) in a fixed manner; the gaps between the individual layers are shown merely for the sake of clarity.

According to FIG. 3a, parts 11b, 11c of the first surface portions 11a, 11b, 11c are each designed in the shape of a circle.

According to FIG. 3b, all first surface portions 11a, 11b, 11c are each designed in the shape of a regular hexagon. In addition, said first surface portions are identical to each other. The second surface portions 12a, 12b, 12c are each designed in the shape of a regular hexagon and identical to each other. The illustrated boundary lines between two adjacent second surface portions 12a, 12b, 12c are shown for illustration. They can also be provided as structural lines of the material used.

According to FIG. 3b, all first surface portions 11a, 11b, 11c are each designed in the shape of a square.

According to FIG. 3b, each of the first surface portions 11a, 11b, 11c is arranged immediately adjacent to six second surface portions 12a, 12b, 12c.

It is understood that the embodiments described above are merely exemplary configurations of the system according to the invention. The configuration of the invention is therefore not limited to these embodiments.

All features disclosed in the application documents are claimed as essential to the invention if they are novel in respect of the prior art individually or in combination.

LIST OF REFERENCE SIGNS 1 vehicle seat
1x length direction
1y width direction
1z height direction
2 backrest part
3 seat part
4, 5 inner portion
6a, 6b, 7a, 7b side bolster portion
9f cushion part
8a, . . . , 8f upholstery part
10f coating
11a, 11b, 11c first surface portions
12a, 12b, 12c second surface portions
20 particles
21 binder matrix
30 finish
31, 33 vinyl
32 textile support
34 primer
40 first surface
41 second surface
t layer thickness

What is claimed is:

1. A vehicle seat for a vehicle, comprising:
  a backrest part and a seat part, each having an inner portion and side bolster portions arranged laterally on both sides of the inner portion, the inner portions and the side bolster portions each having a cushion part and at least one upholstery part at least partially surrounding the cushion part,
  wherein an abrasion-resistant coating that has at least one of a higher hardness or a higher stiffness than the at least one upholstery part is at least in part arranged on the at least one upholstery part, and
  wherein some surface portions of the at least one upholstery part are provided with the abrasion-resistant coating and other surface portions of the upholstery part are free of the abrasion-resistant coating.

2. The vehicle seat according to claim 1, wherein the abrasion-resistant coating has particles that are based on glass, ceramic or metal and bound in a binder matrix consisting of a polymer adhesive.

3. The vehicle seat according to claim 1, wherein the side bolster portions each include a plurality of upholstery parts, and wherein the abrasion-resistant coating is arranged solely on one of the upholstery parts of the side bolster portions.

4. The vehicle seat according to claim 1, wherein the at least one upholstery part has first surface portions and second surface portions, wherein the abrasion-resistant coating is provided over the entire surface of the first surface portions, wherein the second surface portions are free of the abrasion-resistant coating, and wherein a value of a ratio of a total content of the first surface portions to a total content of the second surface portions changes in a course of at least one of a length direction, a width direction, or a height direction of the vehicle seat.

5. The vehicle seat according to claim 4, wherein each of the first surface portions is arranged directly adjacent to at least one of the second surface portions.

6. The vehicle seat according to claim 1, wherein the abrasion-resistant coating has a homogeneous layer thickness of which the value is within a range of 80 μm to 200 μm.

7. The vehicle seat according to claim 1, wherein the first surface portions are each in a shape of a circle or a regular polygon.

8. The vehicle seat according to claim 7, wherein the first surface portions or the second surface portions are each in the shape of a regular hexagon and identical to each other.

9. The vehicle seat according to claim 1, wherein the upholstery part includes a plurality of layers.

10. The vehicle seat according to claim 1, wherein a portion of the upholstery part provided with the abrasion-resistant coating is between the at least a portion of the abrasion resistant coating and the cushion part.

11. The vehicle seat according to claim 10, wherein the upholstery part includes a plurality of layers.

12. The vehicle seat according to claim 1, wherein the abrasion-resistant coating is fixed to the upholstery part.

13. The vehicle seat according to claim 1, wherein the abrasion-resistant coating is adhered to the upholstery part.

14. The vehicle seat according to claim 1, wherein, in a portion of the at least one upholstery part provided with the abrasion-resistant coating, the abrasion-resistant coating is contiguous.

15. The vehicle seat according to claim 1, wherein, in a portion of the at least one upholstery part provided with the abrasion-resistant coating, the abrasion-resistant coating is divided into a plurality of individual, non-contiguous regions.

* * * * *